May 22, 1945.　　　C. ROBINS ET AL　　　2,376,813
ROPE
Filed Nov. 23, 1942
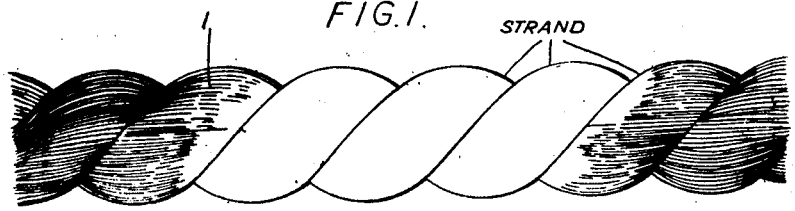
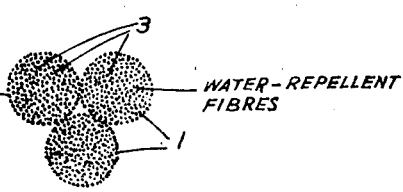
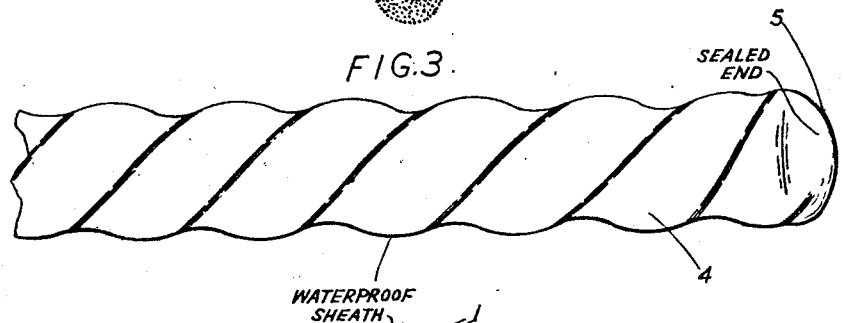
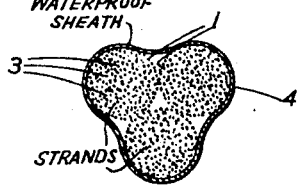
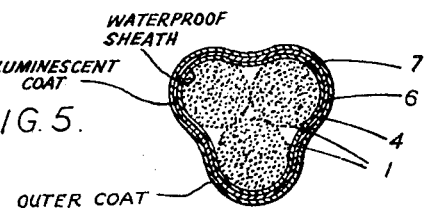
Inventors
Cecil Robins,
By Wilfred Kershaw.
Attorneys Patented May 22, 1945

2,376,813

UNITED STATES PATENT OFFICE 2,376,813

ROPE

Cecil Robins, Bollington, near Macclesfield, and Wilfred Kershaw, Cheadle Hulme, England, assignors to The Fine Cotton Spinners' and Doublers' Association Limited and Bleachers' Association Limited, both of Manchester, England Application November 23, 1942, Serial No. 466,688
In Great Britain April 16, 1942

7 Claims. (Cl. 28—80)

This invention relates to new or improved rope and to methods of producing it.

One object of the invention is to provide a rope which will float on fresh water or sea water for long periods of time and will retain its ability to do so when used. A further object is to provide a rope which will float on fresh water or sea water for upwards of one day and particularly for several days or up to a week or more and will retain its ability to do so when used. A further object is to provide a flexible rope having an effective specific gravity less than 1 and resistant to permeation by fresh water or salt water.

When fibres of cotton, bast fibres, leaf fibres or artificial fibres or mixtures of artificial and natural fibres are made up into rope either by stranding or braiding the resulting rope may have an apparent specific gravity less than 1 but if it is left in contact with water it will imbibe such water more or less rapidly, dependent upon the nature of the fibres, and the interstitial cavities will become filled with water so that the apparent specific gravity is raised to a value greater than 1.

We have now found that it is possible to render such rope so resistant to water as to prevent the interstitial cavities from being filled with water by absorption thereof so that the rope will retain an apparent specific gravity of less than 1 for a period of several days or even of several weeks according to the method of manufacture adopted.

A substantial degree of resistance to wetting can be conferred upon rope by treating the yarns or fibres from which the rope is made with a substance which renders them water repellent and then making a rope from such water repellent yarns or fibres in the usual way either by stranding or braiding or plaiting. The same result is not obtained if an attempt is made to treat a rope, already made by stranding or by braiding on a core, with aqueous solutions or dispersions of substances designed to confer water repellent properties. Probably owing to the fact that the fibres in such ropes are tightly packed and tend to become more tightly packed on wetting it is not possible to secure adequate penetration of aqueous media containing the said substances to confer the desired resistance to wetting upon the rope. If an attempt is made to avoid tightening of the fibres by the use of organic solvents for the water repelling agents, then the interstitial cavities are wholly or partly filled with the water repelling agents and the air is correspondingly displaced making it difficult or impossible to retain a sufficiently low specific gravity. In the case of some plaited or braided ropes, e. g. coreless ropes, it is however, possible satisfactorily to treat the finished rope with aqueous solutions or dispersions of water repelling agents.

A rope thus treated so that the individual fibres are resistant to wetting by water and still retaining in its interstitial cavities sufficient air to give it a specific gravity less than 1 can be made and is capable of floating for a period of from 1 to 10 days depending upon the fibres employed and the nature of the treatment and the tightness with which the rope is made. Rope not treated with water repelling agents will sink in some cases in a few minutes and in other cases in a few hours but will seldom remain floating for periods as long as a day or more. Water does however slowly penetrate into the interstitial cavities of a rope whose fibres have simply been treated with a water repelling agent and accordingly a rope so made will sink after a period of several days, e. g. 10 days, owing to gradual filling of the interstitial cavities with water and corresponding displacement of air therefrom. The rope can, however, be dried again and then regains its buoyancy.

It is not possible to make a serviceable rope which is resistant to wetting and at the same time has a specific gravity less than 1 by simply impregnating it with a water-proofing material such as wax. If the rope itself, or even the yarns or fibres from which it is made are simply impregnated with molten wax or with a solution of wax in an organic solvent, the wax breaks away in use so that the water repelling properties are substantially lost and therefore an apparent specific gravity of less than 1 cannot be retained. Such rope is not, in effect, flexible since when it is flexed it loses its ability to float. We have found, however, that by the use of an aqueous emulsion of fat or wax preferably containing a protein such as casein or gelatin the water-repelling properties are retained by the rope in use and therefore it can retain a specific gravity of less than 1 and can float on water for more than one day.

We have further found, however, that if rope is provided with an enveloping skin or sheeth of waterproof material such as rubber, cellulose ester or a water-insoluble natural or synthetic resin then it is possible for the rope to retain a specific gravity of less than 1 for a period of several weeks at least. Since an enveloping skin of waterproof material is liable to be punctured or broken it is desirable that the rope provided with such skin should first be treated so as to render the individual fibres water repellent e. g. by treatment of the yarns or fibres themselves before making up into rope or by treatment of coreless, loosely braided rope.

Since the rope of the present invention can remain floating on fresh or sea water for over one day and generally for several days or even for several weeks, it is particularly suitable for use as life lines in conjunction with life boats or sea rescue apparatus, rocket lines, landing ropes for sea-borne or water-borne craft or for sea planes or flying boats and the like. For these purposes it may be desirable for the rope to be luminous in the dark and according to a further feature of the invention a rope which is resistant to wetting and has a specific gravity of less than 1 is also provided with a luminescent material.

Some ropes made according to the invention are shown in the accompanying drawing wherein:

Fig. 1 is a side elevation and Fig. 2 a section of a floatable rope not provided with a sheath, Fig. 3 is a side elevation and Fig. 4 is a section of a floatable rope covered with a waterproof sheath, Fig. 5 is a section of a sheathed floatable rope provided with a luminescent coat.

The ropes shown in the drawing are stranded ropes made in the customary way by twisting the strands 1 which are three in number. As shown in Figure 2 the stands 1 are constituted by water-repellent fibres 3. As shown the interstices between the fibres 3 and between the strands 1 are air filled giving the rope an apparent specific gravity less than one. Due to the water-repellency of the fibres 3 water will penetrate only very slowly into these interstices so that the rope will float for a considerable time. Further to resist penetration by water a rope constructed as shown in Fig. 1 may be provided with a waterproof sheath 4 as shown in Figs. 3 and 4. The ends of the rope are sealed by the sheath as shown at 5. The sheath 4 may carry a luminescent substance; for example, as shown in Fig. 5, a luminescent coat 6 may be painted on the sheath 4 and may be covered with an outer coat 7.

In making rope according to the invention in its simplest form a cotton yarn in the grey or dyed or mercerised or mercerised and dyed either in hank form or wound singly or in strands or in warps of single or taped yarn or other convenient package is treated with any suitable waterproofing or water-repelling agent, dried and then made into rope of any desired diameter by stranding, braiding or plaiting. Care must be taken in making such rope that sufficient interstitial air cavities are retained to maintain the apparent specific gravity of the finished rope less than 1. In a similar manner fibres such as flax, manila, hemp, sisal or the like, natural cordage fibres or artificial fibres such ac viscose yarns may be treated.

Suitable known waterproofing or water repelling agents with which the yarns or fibres of the rope (or even a plaited or braided rope itself) may be treated in practising the present invention are, for example, 1 aluminum salts which may be used with or without soap treatment, 2 wax or fat emulsions with or without aluminum salts, 3 protein and wax or protein and fat or protein and wax and fat preparations with or without aluminum salts, 4 water-repelling agents comprising organic nitrogen compounds of the type which can be made from a tertiary nitrogen base, formaldehyde and a fatty alcohol, amine, amide or urethane containing at least ten carbon atoms, which may be termed nitrogenous water-repelling reagents; impregnation with such compounds is usually followed by heating to decompose the quaternary ammonium salt.

The invention will be illustrated by the following examples.

*Example 1*

Cotton yarn is wound from cops and made into hanks for waterproofing. The waterproofing bath is prepared as follows:

Liquor A.—3 lbs. of gelatine or glue are dissolved in 4 lbs. of water, 1½ lbs. of oleic acid are added and the mass is mixed until homogeneous.

Liquor B.—5 lbs. of paraffin wax, 1½ lbs. of aluminium acetate and 20 lbs. of water at 80°–90° C. are intimately mixed in a vessel fitted with mechanical agitators.

Liquor A and Liquor B are then blended and passed through a homogeniser. To the resulting emulsion 2 lbs. of aluminium acetate solution of s. g. 1.16 are added.

A bath is now made up containing 5% to 10% of the above emulsion in water and this is heated in a container to 70° C. The hanks are immersed in this solution for ½ to 1 hour until thoroughly saturated, then hydro-extracted and dried.

After this treatment the yarn is rewound on spools then warped and made into rope. This may be done, for example, as follows:

For a stranded rope each strand consists of 168 ends of 12's count. The rope is made up of three strands giving 504 ends of yarn, a diameter of $\frac{1}{16}$th of an inch and an approximate runnage of 16 yards per pound. For a braided or plaited cord each strand consists of 39 ends of 38's count. The cord is made up of 16 strands giving 624 ends of yarn and has an approximate runnage of 43½ yards per pound.

*Example 2*

Cotton yarn in hank form is (after treating with a wetting agent if desired such as a sulphonated oil and rinsing) immersed in red liquor (aluminium sulphoacetate) having a specific gavity 7.5° Tw. for about five minutes, and then squeezed or hydroextracted and dried at 100–105° C. Then it is immersed in 4% soap solution at 50°–60° C., squeezed or hydro-extracted and again treated with red liquor of 7.5° Tw. The yarn is then rinsed and dried and is ready for making into rope or cord.

Rope is then made from the so-treated yarns by stranding, braiding or plaiting for example as indicated after Example 1 and is finally provided with a sheath of flexible waterproof material of such nature and dimensions that the specific gravity of the whole rope is still less than 1. Such a sheath of flexible waterproof material may be applied in a number of ways, examples of which are the following. In all of these methods it is important that the ends of the rope be also sealed by the sheath. (a) A rubber strip provided with adhesive on one side is wound spirally round the rope, (b) a fabric treated with waterproof adhesive material is wound spirally round the rope, (c) the rope is dipped in or brushed with a latex of raw rubber or vulcanised rubber or synthetic rubber. The dipping or coating may be repeated until a sheath of the required thickness has been built up. Suitable wax emulsions may be added to the latex if desired. If necessary the resulting coating may be cured. After treatment as described in (c) then (d) the rope may be dipped in or brushed with a solution of a water-resistant synthetic resin or chlorinated rubber, one or more coats of which suffice, (e) a sheath of rubber like or resinous material such as rubber, chlorinated rubber or thermoplastic resin may be extruded on to the surface of the rope.

In all of these methods care must be taken that the ends of the rope do not protrude beyond the waterproof sheath (see Fig. 3) and care must also be taken that the material of the sheath does not penetrate so far into the rope that the interstitial spaces are filled.

By way of example the sheath may be applied as follows:

Polyvinyl chloride is softened by heating to a suitable temperature e. g. 154° C. The rope is run at uniform speed through a die and the heated polyvinyl chloride is extruded from the die so as to give a coating approximately 0.030 inches thick. The sheathed rope is then run through cold water to chill and set the polyvinyl chloride giving the structure shown in Fig. 4.

Pigments and colours can be incorporated in the materials from which the sheath is made. Whenever the rope is made of hemp, sisal, manila or the like, the yarns are preferably clipped before treatment.

Rope which has been made without a sheath as in Example 1 will remain floating on water for from 1 to 10 days according to the structure and composition of the rope and according to the conditions of use. If a longer time of floating is required, then the rope made as described in Example 1 should be provided with a waterproof sheath as described in Example 2.

When a rope is required which, besides being buoyant, must also be luminous in the dark it is preferably provided with one or more devices or substances which will luminesce, if necessary after activation. Such activation, where required, may be brought about by exposure to light or other means. These luminescent substances may be applied to the rope in a paint or may be included in the sheath where such is provided.

*Example 3*

A rope of about ⅜ inch diameter, which has been rendered water repellent by the method described in Example 1 or in the first part of Example 2, was given a waterproof sheath 4 by brushing with a mixture of 1.2 parts by weight titanium oxide, 5 parts by weight wax emulsion, 10 parts by weight vulcanised rubber latex. When dry it was given a luminescent coat 6 by brushing with a mixture containing 1.5 parts by weight of phosphor, 2.5 parts by weight of polystyrene resin, 2.5 parts by weight of a plasticizer and 5 parts by weight of xylene. After drying again the rope was given an outer coat 7 by a final brushing with a solution of 5 parts by weight of polystyrene, 5 parts by weight of a plasticizer and 10 parts by weight of xylene. After drying it had the appearance shown in Fig. 5.

Instead of applying the luminescent substance in a flowing solution it may be applied in the form of a hot rubber wax mixture which may contain sufficient volatile solvent to facilitate application.

The invention is not limited to the foregoing examples.

We declare that what we claim is:

1. A flexible rope formed of fibres, said fibres being coated with a water repellent agent and being associated with each other so as to form cavities therebetween and with portions in contact so as to preclude the entrance of water into said cavities, and the periphery of the rope being surrounded with a water repellent agent, the said rope having an apparent specific gravity of less than one whereby the period of floatability of said rope is materially increased.

2. A flexible rope formed of fibres, said fibres being coated with a water repellent agent and being associated with each other so as to form cavities therebetween and with portions in contact so as to preclude the entrance of water into said cavities, and the entire rope being surrounded with a water repellent agent, the said rope having an apparent specific gravity of less than one whereby the period of floatability of said rope is materially increased.

3. A flexible rope formed of fibres, said fibres being coated with a water repellent agent and being associated with each other so as to form cavities therebetween and with portions in contact so as to preclude the entrance of water into said cavities, the periphery of the rope being surrounded with a water repellent agent, the said rope having an apparent specific gravity of less than one whereby the period of floatability of said rope is materially increased, and luminescent matter on the etxerior of the rope.

4. A flexible rope formed of fibres, said fibres being coated with a water repellent agent selected from the group which consists of waxes and fats and being associated with each other so as to form cavities therebetween and with portions in contact so as to preclude the entrance of water into said cavities, and the periphery of the rope being surrounded with a water repellent agent, the said rope having an apparent specific gravity of less than one whereby the period of floatability of said rope is materially increased.

5. A flexible rope formed of fibres, said fibres being coated with a water repellent agent selected from the group which consists of waxes and fats containing a protein and being associated with each other so as to form cavities therebetween and with portions in contact so as to preclude the entrance of water into said cavities, and the periphery of the rope being surrounded with a water repellent agent, the said rope having an apparent specific gravity of less than one whereby the period of floatability of said rope is materially increased.

6. A flexible rope formed of fibres, said fibres being coated with a water repellent agent comprising an aqueous emulsion of a substance selected from the group which consists of waxes and fats and contains an aluminum salt and being associated with each other so as to form cavities therebetween and with portions in contact so as to preclude the entrance of water into said cavities, and the periphery of the rope being surrounded with a water repllent agent, the said rope having an apparent specific gravity of less than one whereby the period of floatability of said rope is materially increased.

7. A flexible rope formed of cellulosic fibres, said fibres being coated with a nitrogenous water repellent agent and being associated with each other so as to form cavities therebetween and with portions in contact so as to preclude the entrance of water into said cavities, and the periphery of the rope being surrounded with a water repellent agent, the said rope having an apparent specific gravity of less than one whereby the period of floatability of said rope is materially increased.

CECIL ROBINS.
WILFRED KERSHAW.